United States Patent
Miller et al.

(10) Patent No.: US 7,738,567 B2
(45) Date of Patent: Jun. 15, 2010

(54) BASELINE WANDER CORRECTION FOR COMMUNICATION RECEIVERS

(75) Inventors: Mor Miller, Tel Aviv (IL); Ariel Yagil, Ramat Hasharon (IL); Itay Lusky, Hod Hasharon (IL); Liran Brecher, Kfar Saba (IL); Amir Peleg, Hod Hasharon (IL); Naftali Sommer, Letzion (IL)

(73) Assignee: Texas Instruments Incorporated, Dallas, TX (US)

( * ) Notice: Subject to any disclaimer, the term of this patent is extended or adjusted under 35 U.S.C. 154(b) by 838 days.

(21) Appl. No.: 11/617,644

(22) Filed: Dec. 28, 2006

(65) Prior Publication Data

US 2008/0159415 A1    Jul. 3, 2008

(51) Int. Cl.
*H04B 3/04*    (2006.01)
*H04B 3/20*    (2006.01)

(52) U.S. Cl. .................................. 375/258; 370/286
(58) Field of Classification Search ................ 375/222, 375/258, 285, 316, 350, 377; 370/282, 286, 370/290–291
See application file for complete search history.

(56) References Cited

U.S. PATENT DOCUMENTS

| | | | |
|---|---|---|---|
| 5,812,597 A * | 9/1998 | Graham et al. ............. 375/257 |
| 6,614,842 B1 * | 9/2003 | Chou et al. ................. 375/232 |
| 6,975,674 B1 * | 12/2005 | Phanse et al. .............. 375/219 |
| 7,065,133 B1 * | 6/2006 | Phanse et al. .............. 375/219 |
| 7,333,603 B1 * | 2/2008 | Sallaway et al. ............ 379/391 |
| 2007/0230640 A1 * | 10/2007 | Bryan et al. ............... 375/349 |
| 2007/0286315 A1 * | 12/2007 | Hong et al. ................ 375/345 |

* cited by examiner

*Primary Examiner*—Khanh C Tran
(74) *Attorney, Agent, or Firm*—Steven A. Shaw; W. James Brady; Frederick J. Telecky, Jr.

(57) ABSTRACT

A novel and useful baseline wander correction mechanism for use with transformer coupled baseband communication receivers. Parametric estimation of the transformer model is used estimate and cancel the baseline wander effect. A parametric model is used to model the baseline wander impairment created by the transmitter and receiver transformers as a high pass filter having an exponential decay parameter alpha. A correction signal for both the far end and echo signal paths are calculated and summed to generate a total correction signal. The total correction signal is partitioned into an analog correction signal that is applied to the analog portion of the communications receiver and into a digital correction signal that is similarly applied to the analog portion of the communications receiver.

21 Claims, 9 Drawing Sheets

BASELINE WANDER CORRECTION FOR COMMUNICATION RECEIVERS

FIELD OF THE INVENTION

The present invention relates to the field of data communications and more particularly relates to an apparatus for and method of baseline wander correction for use in communication receivers.

BACKGROUND OF THE INVENTION

Modern network communication systems are generally of either the wired or wireless type. Wireless networks enable communications between two or more nodes using any number of different techniques. Wireless networks rely on different technologies to transport information from one place to another. Several examples, include, for example, networks based on radio frequency (RF), infrared, optical, etc. Wired networks may be constructed using any of several existing technologies, including metallic twisted pair, coaxial, optical fiber, etc.

Communications in a wired network typically occurs between two communication transceivers over a length of cable making up the communications channel. Each communications transceiver comprises a transmitter and receiver components. The receiver component typically comprises one or more cancellers. Several examples of the type of cancellers typically implemented in Ethernet transceivers, especially gigabit Ethernet transceivers include, echo cancellers, near-end crosstalk (NEXT) cancellers, far-end crosstalk cancellers (FEXT), etc.

Figure 1:
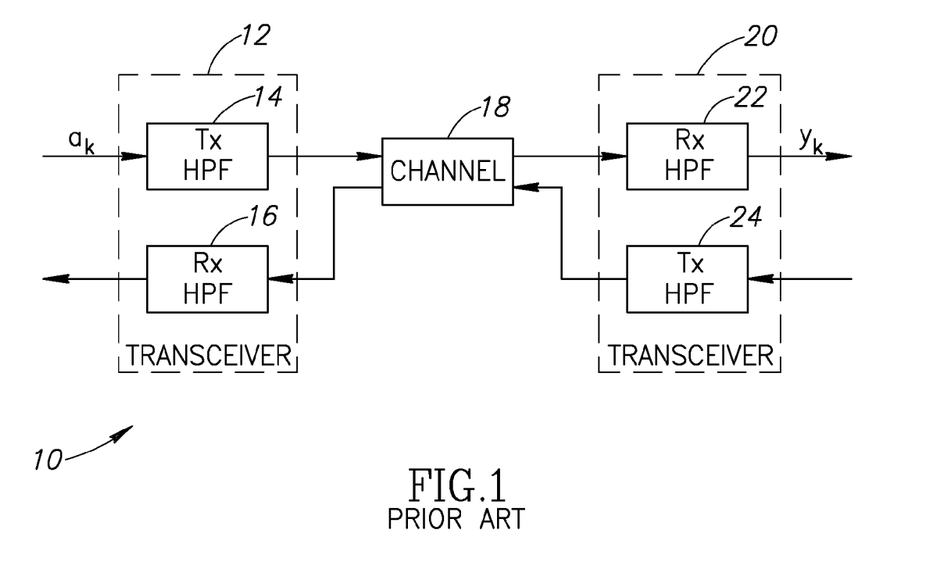
FIG. 1 is a simplified block diagram illustrating a prior art communications channel with baseline wander impairments modeled as high pass filters on both the transmitter and receiver sides of the link.

A typical wired communications link is shown FIG. 1. The link, generally referenced 10, comprises communications transceivers 12, 20 connected by a channel 18. The communications may comprise, for example Ethernet transceiver (e.g., 10Base-T, 100Base-TX or 1000Base-T). Transceiver 12 comprises a transmitter and receiver which include isolation transformers for coupling the Ethernet signal to the channel. The isolation transformers are effectively high pass filters (HPFs) as represented by the TX HPF block 14 and RX HPF block 16. Similarly, the magnetics in transceiver 20 is represented as RX HPF block 22 and TX HPF block 24. In operation, the transmitter on each end of the connection takes its respective input data and converts and encodes it for transmission over the twisted pair wiring of the channel. Each receiver is optimized to receive the transmitted signal and decode it to generate the received output data.

Figure 2:
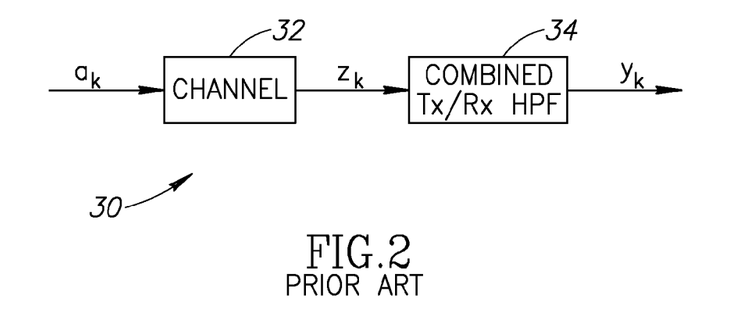
FIG. 2 is a simplified block diagram illustrating a combined representation of the transmitter and receiver high pass filters used to model the baseline wander impairment.

Since both the channel model and the high pass filters are linear, the order of the components of FIG. 1 can be changed without affecting the output. A simplified block diagram illustrating a combined representation of the transmitter and receiver high pass filters used to model the baseline wander impairment is shown in FIG. 2. The combined representation, generally referenced 30, comprises a channel 32 having an input $\alpha_k$ and an output $z_k$ and a combined TX/RX HPF 34 having an output $y_k$.

Ethernet transceivers on either end of a link are AC coupled to the twisted pair wiring connecting them to each other. Most communication networks (including Ethernet networks) whose links are AC coupled suffer from what is referred to as baseline wander or DC droop. For example, wired Ethernet links such as 10, 100 or 1000 Mbps links all exhibit baseline wander. Baseline wander occurs when a very long pulse propagates through an isolation transformer. Decoupling transformers are a standard component in Ethernet receiver circuits. Decoupling transformers act as a high-pass filter having very low cutoff frequencies which typically prevents most frequencies less than 4 kHz from passing through to the receiver circuit. The decoupling transformer, acting as a high pass filter with an extremely low cutoff frequency, eliminates the DC component of the incoming waveform and causes a long pulse to drift towards the common mode. This is known in the art as "DC droop." Thus, the baseline wander is created as a result of the high pass frequency response of the magnetics in both the transmitter and the receiver.

Figure 3:
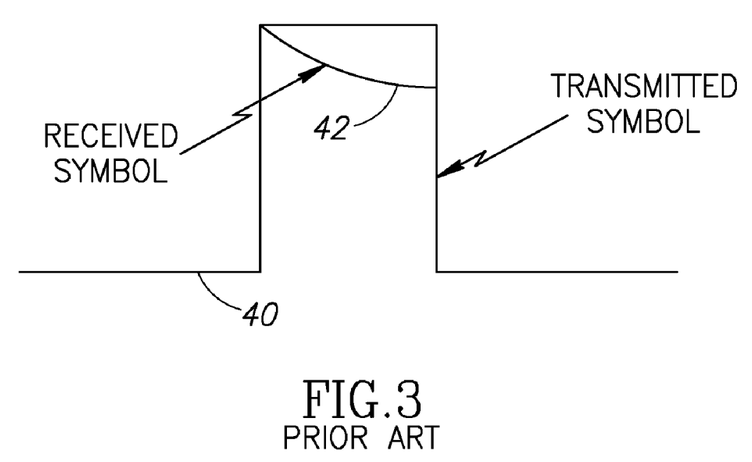
FIG. 3 is a block diagram illustrating the effect of baseline wander on a pulse amplitude modulation symbol.

As a result, transmitted pulses are distorted by a droop effect similar to the exaggerated example shown in FIG. 3. In this example, the transmitted symbol 40 is a pulse amplitude modulated (PAM) signal. The received symbol 42 exhibits the droop effect due to the effect of the magnetics (i.e. high pass filter) in the signal path. It is noted that in long strings of identical symbols, the droop can become so severe that the voltage level passes through the decision threshold, resulting in erroneous sampled values for the affected pulses.

Figure 4:
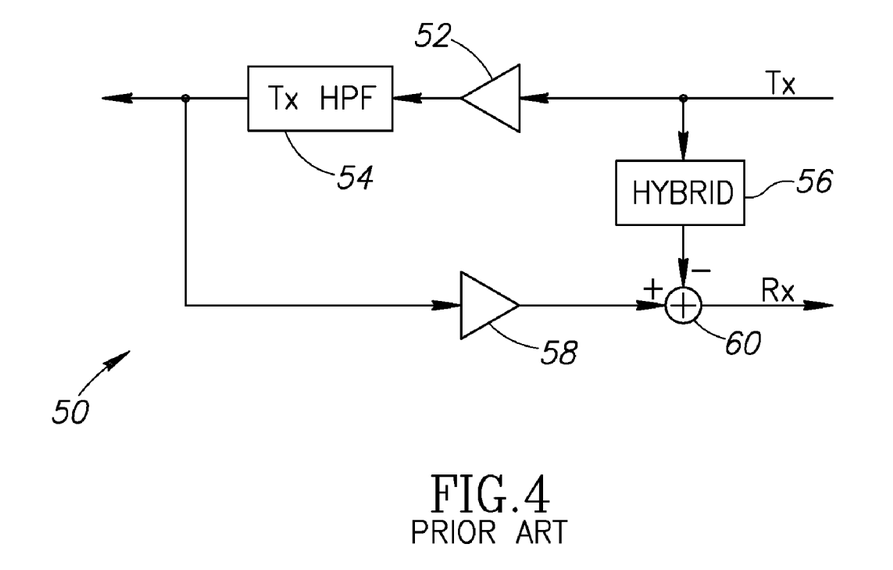
FIG. 4 is a block diagram illustrating a model of echo baseline wander impairment.

In addition to the baseline wander caused by the far end signal, in communication systems using bi-directional transmission on the same line (such as gigabit Ethernet), the echo signal also contributes its own baseline wander in the form of undesired low frequency hybrid compensation as shown in FIG. 4. The circuit, generally referenced 50, comprises a hybrid 56, amplifiers 52, 58, TX high pass filter 54 and adder 60. Note that unlike the far end baseline wander, the echo baseline wander is generated by a single high pass filter. Note also that the echo signal does not suffer from channel attenuation. In fact, it can be up to 10 dB stronger then the far end signal, which makes the echo baseline wander a substantial source of interference.

When the secondary winding of the decoupling transformer decouples the received waveform and sends the signal to the transceiver chip, the DC component of the original waveform does not pass through. When a coded signal (e.g., MLT-3 coded signal) remains constant (i.e. there are no transitions) for periods longer than the cut-off frequency of decoupling transformer, the output of decoupling transformer begins to decay to common mode. This phenomenon is caused by the inductive exponential decay of the decoupling transformer.

Depending on the particular code used, certain strings of bits will generate more baseline wander than others. For example, since the MLT-3 code has a transition for every 1 bit and no transition for every 0 bit, only constant 0 bits (not constant 1 bits) converted into MLT-3 code produce a baseline wander condition. Multiple baseline wander events result in an accumulation of offset which manifests itself either more at +1 V or more at −1 V, depending on the direction the wander goes over time. While certain data patterns can cause very severe baseline wander, statistically random data can reduce the amount of baseline wander, but it would still be significant.

The effects of baseline wander can be reduced, however, by encoding the outgoing signal before transmission. This also reduces the possibility of transmission errors. The early Ethernet implementations, including 10Base-T, used the Manchester encoding method wherein each pulse is identified by the direction of the midpulse transition rather than by its sampled level value.

A problem with Manchester encoding, however, it that it introduces frequency related problems that make it unsuitable for use at higher data rates. Ethernet versions subsequent to 10Base-T all use different encoding procedures that make use of one or more of the techniques of data scrambling, expanded code space and forward error correcting codes.

Data scrambling is a technique that scrambles the bits in each byte in an orderly and recoverable way. Some 0s are changed to is, some is are changed to 0s, and some bits are left the unchanged. The result is reduced run-lengths of same-value bits, increased transition density and easier clock recovery. Expanding the code space is a technique that allows the assignment of separate codes for data and control symbols (e.g., start-of-stream and end-of-stream delimiters, extension bits, etc.) which assists in the detection of transmission errors.

Even after coding and scrambling, baseline wander can still occur depending on the case and input data. For example, in 100Base-TX baseline wander can still occur because numerous runs of 0 bits can be generated by the scrambler. The scrambler generates numerous 0 bits when certain packets, known as "killer packets," enter the scrambler. The probability of a killer packet entering a scrambler is a small number out of all the possible data packet permutations. Further, even if a killer packet enters the scrambler, a problem arises only if the data pattern aligns with the scrambler seed. The probability of this happening is one out of every 2,047 tries. Although the occurrence of killer packets are a rare occurrence in the real world statistically, they are often used in during the design and testing of transceivers to demonstrate the baseline wander problem.

Forward error correcting codes are encodings which add redundant information to the transmitted data stream so that some types of transmission errors can be corrected during frame reception. Forward error-correcting codes are used in 1000Base-T to achieve an effective reduction in the bit error rate. Ethernet protocol limits error handling to detection of bit errors in the received frame. Recovery of frames received with uncorrectable errors or missing frames is the responsibility of higher layers in the protocol stack.

Therefore, what is needed is an apparatus and method that is effective in mitigating the effects associated with baseline wander. Ideally, the mechanism would have minimal cost impact in terms of components, power consumption, computing resources and board or chip real estate.

SUMMARY OF THE INVENTION

The present invention is a novel and useful apparatus for and method of baseline wander cancellation for use in transformer coupled, baseband communication receivers. The mechanism of the present invention is applicable to many types of wired networks and is particularly applicable to 802.3 standard based wired Ethernet networks, including 10Base-T, 100Base-TX and 1000Base-T networks.

Although the mechanism of the present invention can be used in numerous types of communication networks, to aid in illustrating the principles of the present invention, the baseline wander cancellation mechanism is described in the context of a 1000Base-T Ethernet transceiver (i.e. Gigabit Ethernet or GE). It is appreciated that the invention is not limited to the example applications presented but can be applied to other communication systems as well without departing from the scope of the invention.

The mechanism of the present invention overcomes the problems associated with the prior art by providing a solution based on a parametric model of the high pass filters causing the baseline wander. This results in an accurate correction signal that is subsequently partitioned into separate analog and digital correction signals. Use of the mechanism of the present invention provides more accurate baseline wander mitigation and improved receiver performance over than prior art solutions.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the present invention, a method of baseline wander correction for use in a transformer coupled baseband communications receiver, the method comprising the steps of modeling baseline wander effect as a high pass filter resulting in a parametric model therefrom, determining a total correction signal based on the parametric model and generating a digital correction signal and an analog correction signal based on the total correction signal.

There is also provided in accordance with the present invention, an apparatus for correcting baseline wander in a transformer coupled baseband communications receiver comprising a parametric model adapted to model baseline wander as one or more high pass filters, the parametric model comprising an exponential decay factor alpha, a parameter estimator operative to estimate the alpha parameter and means for determining a total correction signal based on the alpha parameter and means for generating a digital correction signal and an analog correction signal based on the total correction signal.

There is further provided in accordance with the present invention, an apparatus for baseline wander correction in a transformer coupled baseband communications receiver comprising a first circuit operative to generate a first correction signal for a far end signal path based on a parametric model wherein the baseline wander is modeled as one or more high pass filters having an exponential decay factor alpha, a second circuit parallel to the first circuit and operative to generate a second correction signal for an echo signal path based on the parametric model, means for summing the first correction signal and the second correction signal to yield a total correction signal therefrom and means for partitioning the total correction signal into a digital correction signal and an analog correction signal.

There is also provided in accordance with the present invention, a baseband communications transceiver transformer coupled to a channel comprising a transmitter, a receiver comprising a front end transformer, baseline wander correction circuit, an analog to digital converter, an equalizer and a decoder and the baseline wander correction circuit comprising a parametric model adapted to model baseline wander as a high pass filter, the parametric model comprising an exponential decay factor alpha, a parameter estimator operative to estimate the alpha parameter and means for determining a total correction signal based on the alpha parameter and means for generating a digital correction signal and an analog correction signal based on the total correction signal.

There is further provided in accordance with the present invention, a method of baseline wander correction for use in a transformer coupled baseband communications receiver having an analog portion and a digital portion, the method comprising the steps of performing parametric estimation of transmitter and receiver transformers to yield a parametric model therefrom, estimating baseline wander effect utilizing the parametric model to yield a total correction signal therefrom and generating a digital correction signal and an analog correction signal from the total correction signal, canceling the baseline wander by applying the analog correction signal to the analog portion of the communications transceiver and by applying the digital correction signal to the digital portion of the communications transceiver.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| AC | Alternating Current |
| ADC | Analog to Digital Converter |
| ASIC | Application Specific Integrated Circuit |
| BLW | Baseline Wander |
| DC | Direct Current |
| DFE | Decision Feedback Equalizer |
| DSP | Digital Signal Processor |
| FEXT | Far-End Crosstalk |
| FFE | Feed Forward Equalizer |
| FPGA | Field Programmable Gate Array |
| GE | Gigabit Ethernet |
| HDL | Hardware Description Language |
| HPF | High Pass Filter |
| IC | Integrated Circuit |

-continued

| Term | Definition |
|---|---|
| IEEE | Institute of Electrical and Electronics Engineers |
| ISI | Intersymbol Interference |
| LMS | Least Mean Squares |
| LPF | Low Pass Filter |
| NEXT | Near-End Crosstalk |
| PAM | Pulse Amplitude Modulation |
| RF | Radio Frequency |
| STP | Shielded Twisted Pair |
| UTP | Unshielded Twisted Pair |

DETAILED DESCRIPTION OF THE INVENTION

The present invention is a novel and useful apparatus for and method of baseline wander cancellation for use in transformer coupled, baseband communication receivers. The mechanism of the present invention is applicable to many types of wired networks and is particularly applicable to 802.3 standard based wired Ethernet networks, including 10Base-T, 100Base-TX and 1000Base-T networks.

Although the mechanism of the present invention can be used in numerous types of communication networks, to aid in illustrating the principles of the present invention, the baseline wander cancellation mechanism is described in the context of a 1000Base-T Ethernet transceiver (i.e. Gigabit Ethernet or GE). It is appreciated that the invention is not limited to the example applications presented but can be applied to other communication systems as well without departing from the scope of the invention.

The mechanism of the present invention overcomes the problems associated with the prior art by providing a solution based on a parametric model of the high pass filters causing the baseline wander. This results in an accurate correction signal that is subsequently partitioned into separate analog and digital correction signals. Use of the mechanism of the present invention provides more accurate baseline wander mitigation and improved receiver performance over than prior art solutions.

Although the mechanism of the present invention can be used in numerous types of communication networks, to aid in illustrating the principles of the present invention, the description of the baseline wander cancellation mechanism is provided in the context of a 1000Base-T Ethernet transceiver (i.e. Gigabit Ethernet or GE). The baseline wander mitigation mechanism of the present invention has been incorporated in an Ethernet IC adapted to provide 10Base-T, 100Base-TX and 1000Base-T communications over a metallic twisted pair channel. Although the invention is described in the context of a gigabit Ethernet PHY communications link, it is appreciated that the invention is not limited to the example applications presented, but that one skilled in the art can apply the principles of the invention to other communication systems as well without departing from the scope of the invention.

It is appreciated by one skilled in the art that the baseline wander cancellation mechanism of the present invention can be adapted for use with any baseband wired communications networks wherein the transceivers are transformer coupled to the media, e.g., asynchronous or synchronous DSL channels, coaxial channels, etc.

Note that throughout this document, the term communications device is defined as any apparatus or mechanism adapted to transmit, receive or transmit and receive data through a medium. The term communications transceiver is defined as any apparatus or mechanism adapted to transmit and receive data through a medium. The communications device or communications transceiver may be adapted to communicate over any suitable medium, including wired media such as twisted pair cable or coaxial cable. The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term baseline wander is defined as a phenomenon that occurs when a waveform is passed through a decoupling transformer, also referred to as "DC droop," which results in a large drift of the waveform above or below the return voltage, often measured in hundreds of millivolts. A waveform is defined as a train of pulses.

Figure 5:
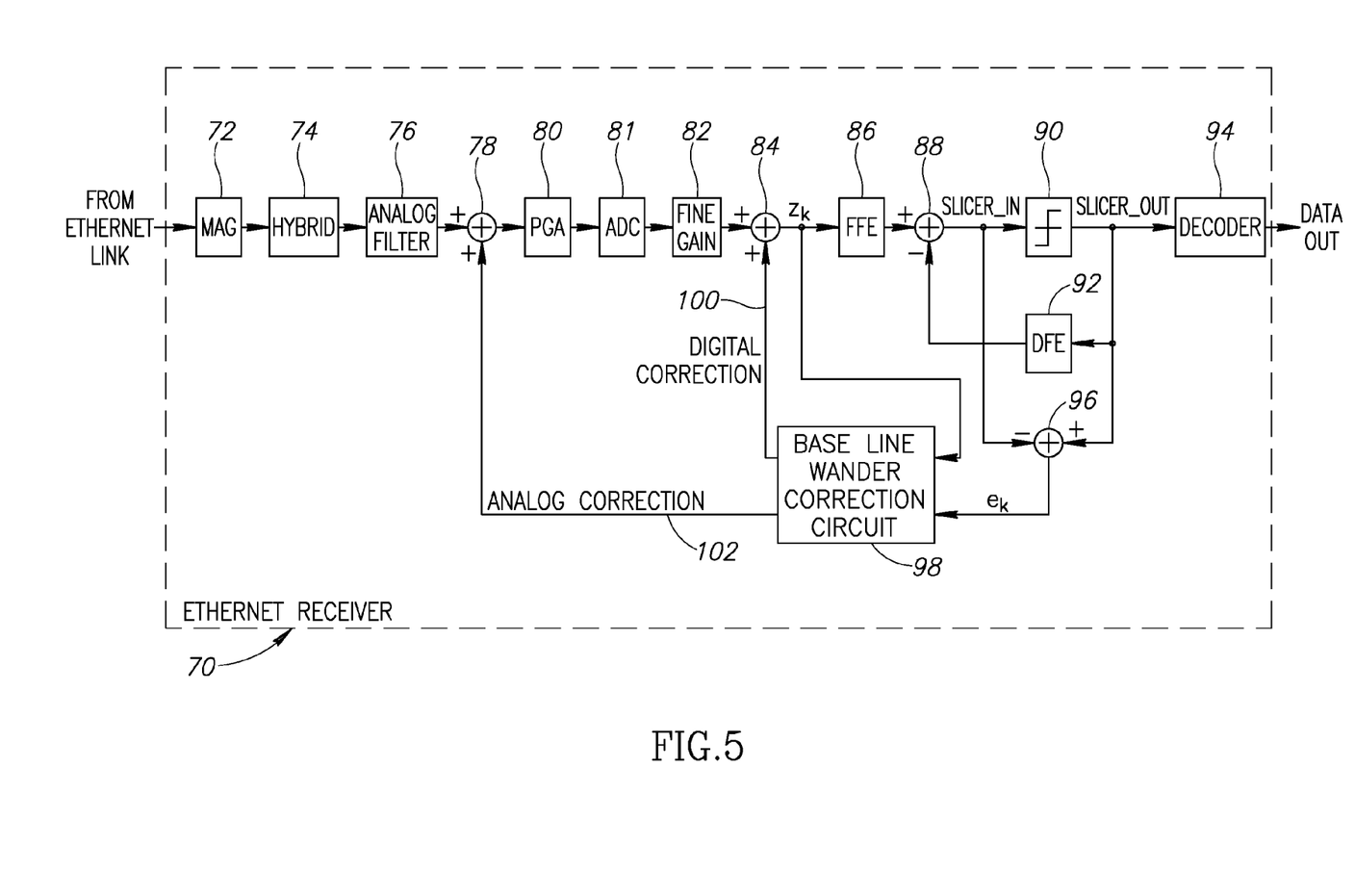
FIG. 5 is a block diagram illustrating an example communications receiver circuit incorporating the baseline wander correction circuit of the present invention.

A block diagram illustrating an example communications receiver circuit incorporating the baseline wander correction circuit of the present invention is shown in FIG. 5. A wired Ethernet link, 1000Base-T for example, comprises two transceivers (one a master and the other a slave), each comprising a plurality of transmitters, receivers and hybrid circuits. The transceivers are coupled by a plurality of twisted pair cables. A gigabit Ethernet communications link is characterized by full duplex transmission over Category 5 and higher cable that may be shielded (STP) or unshielded twisted pair (UTP) cable. The cable comprises four twisted metallic copper pairs wherein all four pairs are used for both transmission and reception. Note that for notation purposes, each one of the twisted pairs is referred to as a 'channel' and the combined four twisted pair bundle generating one gigabit Ethernet connection is referred to as a 'cable'.

In operation, each transceiver receives an input data stream from an external data source such as a host or other entity (not shown). The transceiver generates an output symbol stream from the input data stream and transmits the output symbol stream over the communications channel to the transceiver on the other side. The transceivers on either end of a channel are considered link partners. A link partner can be either active or inactive. An inactive link partner is a transceiver that is not transmitting at the moment. An active link partner is a transceiver that is currently transmitting.

In the receive direction, each transceiver receives a receive signal from the communications channel. The receive signal may comprise an input symbol stream transmitted from the link partner. The transceiver generates an output from this input symbol stream. The receive signal may also comprise a signal representing energy from any number of interference sources, e.g., an echo signal representing the original transmitted signal that has been reflected back towards the transceiver. The transmitted signal may be reflected back due to a channel fault such as an open cable, shorted cable, unmatched load or any irregularities in impedance along the length of the cable. Such irregularities may be caused by broken, bad or loose connectors, damaged cables or other faults.

The Ethernet PHY environment is typically exposed to diverse interference sources. Several of these interference sources include near-end echo, far-end echo, attenuation, near-end crosstalk and far-end crosstalk. Another impairment, commonly considered an ISI problem is baseline wander which the present invention attempts to mitigate. The main interference sources (i.e. Ethernet impairments or noise sources) an Ethernet transceiver is exposed are described below. Note that these and other impairments may be applicable to other communication link PHY schemes and are not to be limited to gigabit Ethernet.

A conventional 1000Base-T transmitter circuit (not shown) comprises a partial response shaper, zero order hold block, transmit low pass filter (LPF) and Ethernet transmitter magnetics. The transmit low pass filter has one pole at approximately 100 MHz (i.e. between 70.8 MHz to 117 MHz, the actual frequency is not critical). The magnetics comprise, inter alia, an isolation transformer which can effectively be modeled as a high pass filter having a pole at approximately 100 kHz or lower.

In operation, data symbols to be transmitted on the link are generated from the TX data input to the transmitter. The partial response filter functions as a pulse shaping filter which shapes the symbols for better transmission over the link. The symbols are then low pass filtered and then output through the isolation transformer.

With reference to FIG. 5, the example 1000Base-T Ethernet receiver circuit, generally referenced 70, comprises magnetics block 72 (i.e. isolation transformer) coupled to the twisted pair channel, a hybrid circuit 74, an analog filter circuit 76, adders 78, 84, 88, 96, programmable gain amplifier (PGA) 80, analog to digital converter 81, fine gain block 82, feedforward equalizer (FFE) 86, slicer 90, decision feedback equalizer (DFE) 92, decoder 94 and baseline wander correction circuit 98.

As a solution to the baseline wander problem, the baseline wander correction circuit is operative to estimate the total baselines wander correction. This correction is then partitioned into analog and digital correction signals, which are added at appropriate points in the circuit. With reference to the example receiver shown in FIG. 5, the circuit generates the analog correction signal 102 and digital correction signal 100 as a function of the slicer error signal $e_k$ and the signal $z_k$ taken before the FFE 86. The analog correction signal is added after the analog filter and before the ADC. The digital correction signal is added after the fine gain but before the FFE.

Figure 6:
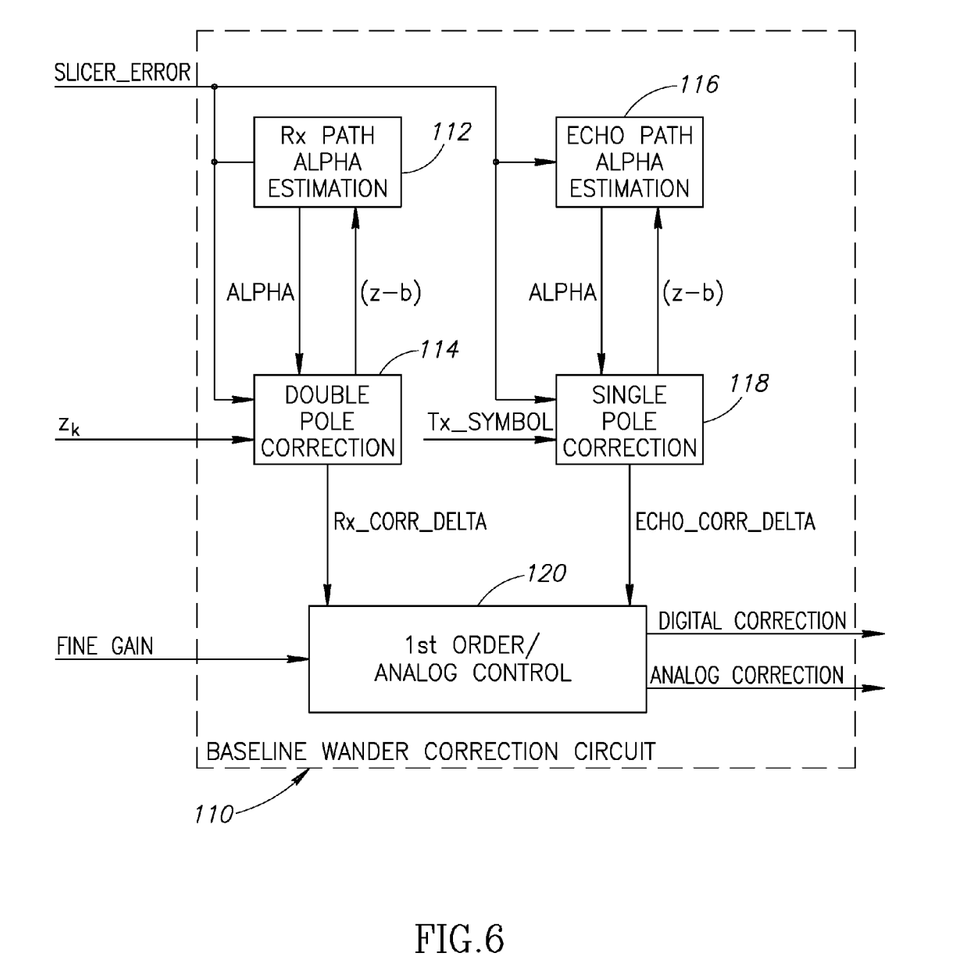
FIG. 6 is a block diagram illustrating the baseline wander correction circuit of the present invention in more detail.

A block diagram illustrating the baseline wander correction circuit of the present invention in more detail is shown in FIG. 6. The baseline wander circuit, generally referenced 110, comprises two parallel $2^{nd}$ order paths, one for the far end baseline wander (comprising RX path alpha estimation 112 and double pole correction 114) and one for the echo baseline wander (comprising echo path alpha estimation 116 single pole correction 118). Both corrections are then summed and added to a $1^{st}$ order correction and translated to analog and digital correction signals ($1^{st}$ order/analog control block 120).

The $2^{nd}$ order correction is based on estimating the exponential decay factor of the high pass filter (referred to as alpha a throughout this document), and then applying the correction based thereon in accordance with the appropriate model, i.e. single or double pole. The correction is accumulated locally to serve as "clean" feedback to the loops (without other correction components such as the $1^{st}$ order or compensations for analog corrections). The output to the rest of the system, however, is the delta, i.e. the addition to the correction signal at each clock cycle. This delta is then summed with the other correction components.

Figure 7:
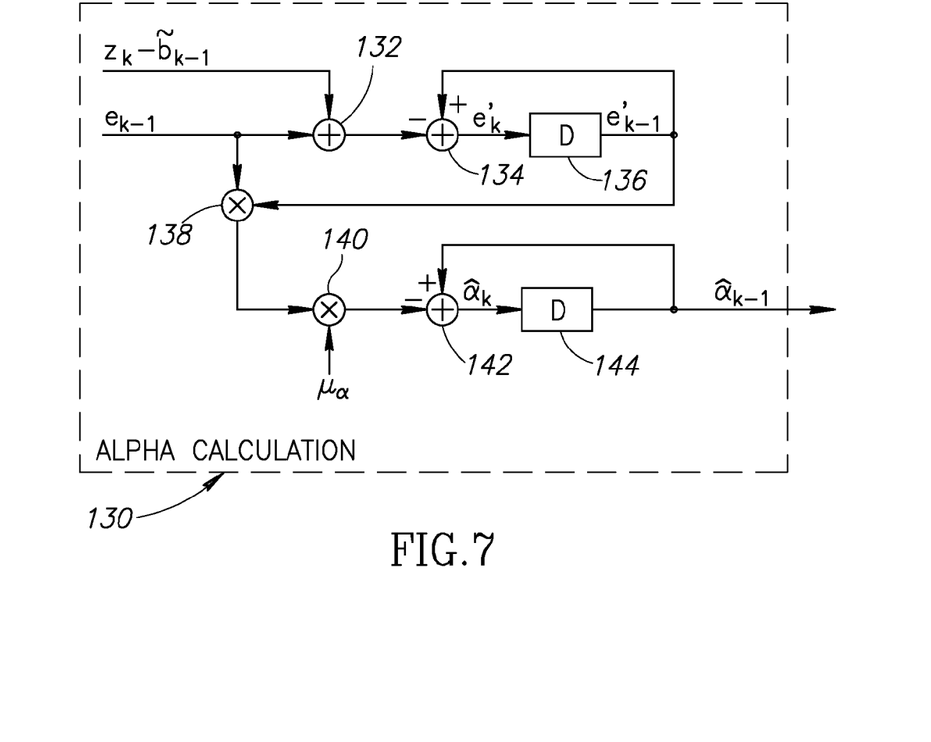
FIG. 7 is a block diagram illustrating the alpha calculation circuit portion of the baseline wander correction circuit in more detail.

A block diagram illustrating the alpha calculation circuit portion of the baseline wander correction circuit in more detail is shown in FIG. 7. The alpha correction circuit, generally referenced 130, comprises adders 132, 134, 142, multipliers 138, 140 and delay blocks 136, 144. The parameter alpha (α) represents the total high pass response of the RX signal and echo paths.

Figure 12:
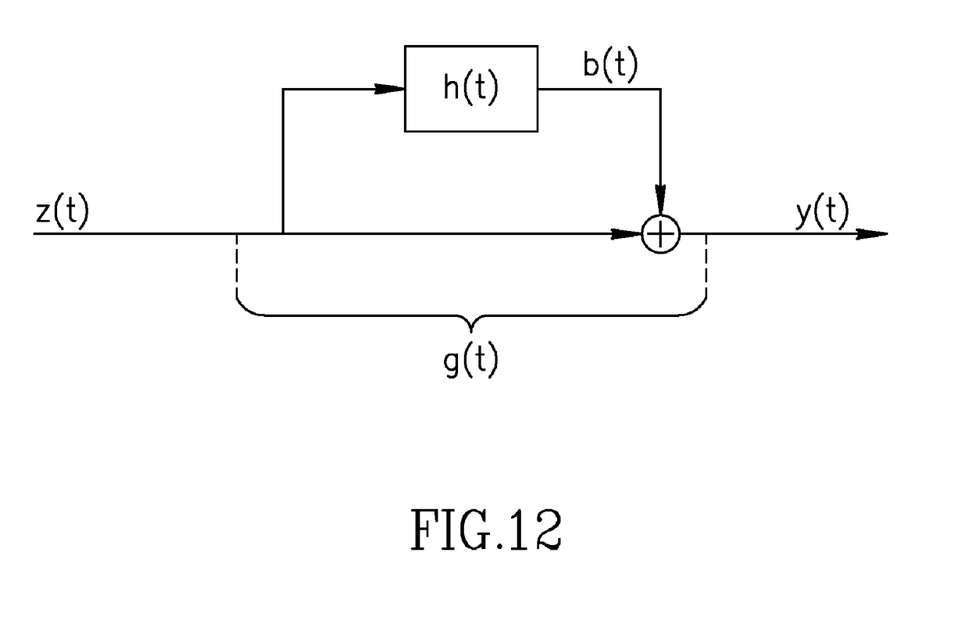
FIG. 12 is a block diagram illustrating the parametric model used to model the baseline wander effect.

The parameter α can be expressed mathematically as described in the following derivation. With reference to the parametric model shown in FIG. 12, let z(t) be the signal at the output of the channel, b(t) the added baseline wander and y(t)

the final signal. In addition, let g(t) be the total response between z(t) and y(t), and h(t) be the response between z(t) and b(t).

In order to estimate a using the least mean squares (LMS) algorithm, the gradient of the error is needed. Considering no other impairments, the slicer error is equivalent to the baseline wander estimation error $$e_n = b_n - \hat{b}_n \qquad (1)$$

where $b_n$ is the real added baseline wander value of the $n^{th}$ symbol, $\hat{b}_n$ is the estimated value and $e_n$ is the estimation error.

When using the single pole model explained herein, and Equation 18 below, we obtain $$e_n = [(1-\alpha)b_{n-1} - \alpha \cdot z_{n-1}] - [(1-\hat{\alpha})\hat{b}_{n-1} - \hat{\alpha} \cdot z_{n-1}] = \qquad (2)$$
$$= (1-\alpha)(b_{n-1} - \hat{b}_{n-1}) - (\alpha - \hat{\alpha})(z_{n-1} + \hat{b}_{n-1}) =$$
$$= e_{n-1}(1-\alpha) - (\alpha - \hat{\alpha})(z_{n-1} + \hat{b}_{n-1})$$

The error gradient is then expressed as $$\frac{\partial e_n}{\partial \alpha} = (1-\alpha)\frac{\partial e_{n-1}}{\partial \alpha} - e_{n-1} - (z_{n-1} + \hat{b}_{n-1}) \qquad (3)$$

Therefore, we can evaluate the gradient $e_n'$ by using values available to the baseline wander loop to obtain the equations for α

$$e_n' = (1-\hat{\alpha}_{n-1})e_{n-1}' - e_{n-1} - (z_{n-1} + \hat{b}_{n-1})$$
$$\hat{\alpha}_n = \hat{\alpha}_{n-1} - \mu_\alpha e_n' e_n \qquad (4)$$

The final equations for α is as below.

$$e_n' = (1-\hat{\alpha}_{n-1})e_{n-1}' - e_{n-1} - (z_{n-1} - \hat{b}_{n-1})$$
$$\hat{\alpha}_n = \hat{\alpha}_{n-1} - \mu_\alpha e_n' e_n \qquad (5)$$

The circuit 130 is operative to implement the calculations of Equation 5. Note that we estimate $\hat{b}_n = -\hat{b}_n$, which is the correction, and not the added BLW signal. We also add the $1^{st}$ order correction to stabilize the loop and compensate for noise and model inaccuracies, but we keep it separate from the $2^{nd}$ order loops.

The value of α is a parameter of the system and is typically constant. To simplify the circuit 130, (1−α) is approximated as 1.

The single pole $2^{nd}$ order correction is used for the echo baseline wander correction. The single pole correction model is derived as follows.

With reference to FIG. 12, the response of g(t) to a step input u(t) is $$g_u(t)e^{-t/\tau_0}u(t) \qquad (6)$$

where $\tau_0$ is the time constant of the high pass filter, which is calculated as $$\tau_0 = \frac{1}{2\pi f_p} \qquad (7)$$

where $f_p$ is the frequency in Hz of the pole of the HPF. Deriving the above Equation 7 yields the following impulse response $$g(t) = \delta(t) - \frac{1}{\tau_0}e^{-t/\tau_0}u(t) \qquad (8)$$

As a result $$h(t) = -\frac{1}{\tau_0}e^{-t/\tau_0}u(t) \qquad (9)$$

The equation for b(t) can the be expressed as $$b(t) = z(t) \otimes h(t) = -\frac{1}{\tau_0}\int_{-\infty}^{t} z(\tau)e^{-(t-\tau)/\tau_0}d\tau \qquad (10)$$

When sampling at t=nT $$b_n = b(nT) = -\frac{1}{\tau_0}\int_{-\infty}^{nT} z(\tau)e^{-(nT-\tau)/\tau_0}d\tau \qquad (11)$$

We substitute τ for kT+τ to yield the following $$b_n = -\frac{1}{\tau_0}\sum_{k=-\infty}^{n-1}\int_0^T z(kT+\tau)e^{-(nT-kT-\tau)/\tau_0}d\tau = \qquad (12)$$
$$-\frac{1}{\tau_0}\sum_{k=-\infty}^{n-1}e^{-(n-k)T/\tau_0}\int_0^T z(kT+\tau)e^{\tau/\tau_0}d\tau$$

We can estimate z(t) as a zero order hold interpolation of its known samples $z_n$ as follows $$z(kT+\tau) \approx z_k \qquad (13)$$

Since $$\frac{T}{\tau_0}$$

is small value (max 0.01), we can linearly estimate the exponent $$e^{\tau/\tau_0} \cong 1 + \frac{\tau}{\tau_0} \qquad (14)$$

And therefore $$b_n = -\frac{1}{\tau_0}\sum_{k=-\infty}^{n-1}e^{-(n-k)T/\tau_0}z_k\int_0^T \left(1+\frac{\tau}{\tau_0}\right)dt = \qquad (15)$$

-continued $$= -\frac{1}{\tau_0}\sum_{k=-\infty}^{n-1} e^{-(n-k)T/\tau_0} z_k \left[\tau + \frac{\tau^2}{2\tau_0}\right]_0^T =$$

$$= -\frac{T}{\tau_0}\left(1 + \frac{T}{2\tau_0}\right)\sum_{k=-\infty}^{n-1} e^{-(n-k)T/\tau_0} z_k$$

When changing to a recursion $$b_n = e^{-T/\tau_0} \cdot b_{n-1} - \frac{T}{\tau_0}\left(1 + \frac{T}{2\tau_0}\right)e^{-T/\tau_0} z_{n-1} \tag{16}$$

We mark $$\alpha = \frac{T}{\tau_0} \tag{17}$$

Using a linear approximation for the exponent in Equation 14, and leaving out higher powers of α, we obtain $$b_n = (1-\alpha) \cdot b_{n-1} - \alpha \cdot z_{n-1} \tag{18}$$

The final equation for the single pole baseline correction that is used for echo baseline wander correction is as follows $$\Delta \hat{b}_n^S = \hat{\alpha}_{n-1} \cdot (z_{n-1} - \hat{b}_{n-1}^S)$$

$$\hat{b}_n^S = \hat{b}_{n-1}^S + \Delta \hat{b}_n^S \tag{19}$$

where $\hat{b}_n^S$ is the baseline wander correction for the $n^{th}$ symbol, according to the single-pole model.

Figure 8:
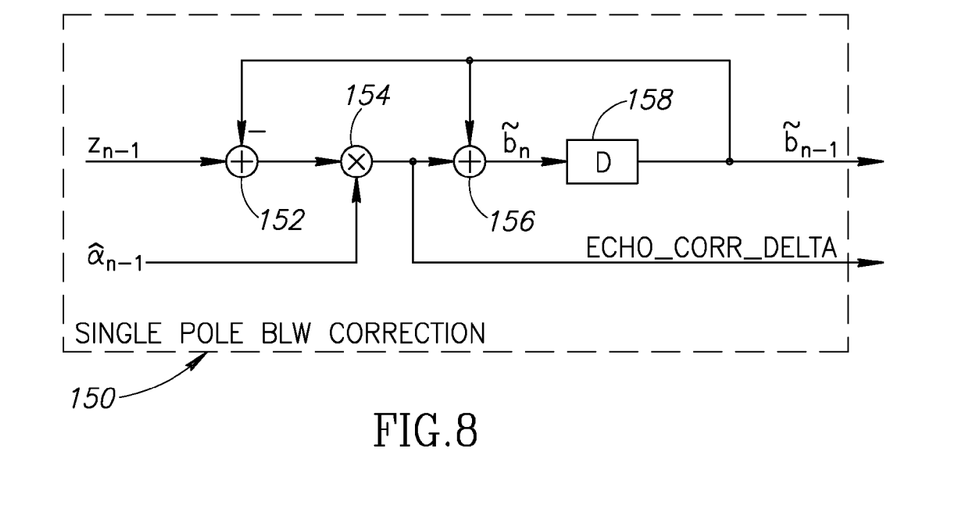
FIG. 8 is a block diagram illustrating the single pole baseline wander correction circuit of the present invention in more detail.

A block diagram illustrating the single pole baseline wander correction circuit of the present invention in more detail is shown in FIG. 8. The single pole baseline wander correction circuit used in the echo path, generally referenced 150, comprises adders 152, 156, multiplier 154 and delay block 158. The baseline wander correction calculation is dynamic and implements the calculations of Equation 19.

Double pole $2^{nd}$ order correction is used for the far end baseline wander correction. The double pole correction model is derived as follows.

We recall from Equation 8

$$g(t) = \delta(t) - \frac{1}{\tau_0} e^{-t/\tau_0} u(t) \tag{8}$$

Using two filters in a row yields $$g_2(t) = g(t) \otimes g(t) = \delta(t) - \frac{2}{\tau_0} e^{-t/\tau_0} u(t) + \frac{1}{\tau_0^2} t e^{-t/\tau_0} u(t) \tag{20}$$

and $$h_2(t) = -\frac{2}{\tau_0} e^{-t/\tau_0} u(t) + \frac{1}{\tau_0^2} t e^{-t/\tau_0} u(t) \tag{21}$$

The equation for b(t) is therefore $$b(t) = z(t) \otimes h_2(t) = \tag{22}$$

$$-\frac{2}{\tau_0}\int_{-\infty}^t z(\tau) e^{-(t-\tau)/\tau_0} d\tau + \frac{1}{\tau_0^2}\int_{-\infty}^t z(\tau) e^{-(t-\tau)/\tau_0}(t-\tau) d\tau$$

When sampling at t=nT and substituting τ for kT+τ we obtain $$b_n = -\frac{2}{\tau_0}\sum_{k=-\infty}^{n-1}\int_0^T z(kT+\tau) e^{-(nT-kT-\tau)/\tau_0} d\tau + \tag{23}$$

$$\frac{1}{\tau_0^2}\sum_{k=-\infty}^{n-1}\int_0^T z(kT+\tau) e^{-(nT-kT-\tau)/\tau_0}(nT-kT-\tau) d\tau =$$

$$-\frac{2}{\tau_0}\sum_{k=-\infty}^{n-1} e^{-(n-k)T/\tau_0}\int_0^T z(kT+\tau) e^{\tau/\tau_0} d\tau +$$

$$\frac{1}{\tau_0^2}\sum_{k=-\infty}^{n-1} e^{-(n-k)T/\tau_0}\int_0^T z(kT+\tau) e^{\tau/\tau_0}(nT-kT-\tau) d\tau$$

$$= -\frac{2}{\tau_0}\sum_{k=-\infty}^{n-1} e^{-(n-k)T/\tau_0}\int_0^T z(kT+\tau) e^{\tau/\tau_0} d\tau +$$

$$\frac{T}{\tau_0^2}\sum_{k=-\infty}^{n-1}(n-k) e^{-(n-k)T/\tau_0}\int_0^T z(kT+\tau) e^{\tau/\tau_0} d\tau -$$

$$\frac{1}{\tau_0^2}\sum_{k=-\infty}^{n-1} e^{-(n-k)T/\tau_0}\int_0^T z(kT+\tau) e^{\tau/\tau_0} \tau d\tau =$$

$$\sum_{k=-\infty}^{n-1}\left(\frac{(n-k)T}{\tau_0^2} - \frac{2}{\tau_0}\right) e^{-(n-k)T/\tau_0}\int_0^T z(kT+\tau) e^{\tau/\tau_0} d\tau -$$

$$\frac{1}{\tau_0^2}\sum_{k=-\infty}^{n-1} e^{-(n-k)T/\tau_0}\int_0^T z(kT+\tau) e^{\tau/\tau_0} \tau d\tau$$

We then apply the same approximations as in the previous calculation (for a single pole). Note also that the first integral is identical to the one calculated previously, to obtain $$b_n = \sum_{k=-\infty}^{n-1}\left(\frac{(n-k)T}{\tau_0^2} - \frac{2}{\tau_0}\right) T e^{-(n-k)T/\tau_0} z_k \left(1 + \frac{T}{2\tau_0}\right) - \tag{24}$$

$$\frac{1}{\tau_0^2}\sum_{k=-\infty}^{n-1} e^{-(n-k)T/\tau_0} z_k \int_0^T\left(1 + \frac{\tau}{\tau_0}\right)\tau d\tau =$$

$$\frac{T}{\tau_0}\left(1 + \frac{T}{2\tau_0}\right)\sum_{k=-\infty}^{n-1}\left(\frac{(n-k)T}{\tau_0} - 2\right) e^{-(n-k)T/\tau_0} z_k -$$

$$\frac{1}{\tau_0^2}\sum_{k=-\infty}^{n-1} e^{-(n-k)T/\tau_0} z_k \left[\frac{\tau^2}{2} + \frac{\tau^3}{3\tau_0}\right]_0^T =$$

$$\frac{T}{\tau_0}\left(1 + \frac{T}{2\tau_0}\right)\sum_{k=-\infty}^{n-1}\left(\frac{(n-k)T}{\tau_0} - 2\right) e^{-(n-k)T/\tau_0} z_k -$$

$$\left(\frac{T}{\tau_0}\right)^2\left(\frac{1}{2} + \frac{T}{3\tau_0}\right)\sum_{k=-\infty}^{n-1} e^{-(n-k)T/\tau_0} z_k$$

And as a recursion $$b_n = e^{-T/\tau_0} \cdot b_{n-1} + \left(\frac{T}{\tau_0}\right)^2 \left(1 + \frac{T}{2\tau_0}\right) \sum_{k=-\infty}^{n-1} e^{-(n-k)T/\tau_0} z_k - \frac{T}{\tau_0}\left(1 + \frac{T}{2\tau_0}\right) e^{-T/\tau_0} z_{n-1} - \left(\frac{T}{\tau_0}\right)^2 \left(\frac{1}{2} + \frac{T}{3\tau_0}\right) e^{-T/\tau_0} z_{n-1} \quad (25)$$

We mark as done previously (the factor of 2 appears because there are two poles)

$$\alpha = 2\frac{T}{\tau_0} \quad (26)$$

$$c_n = \left(\frac{T}{\tau_0}\right)^2 \left(1 + \frac{T}{2\tau_0}\right) \sum_{k=-\infty}^{n-1} e^{-(n-k)T/\tau_0} z_k \quad (27)$$

And obtain $$b_n = e^{-T/\tau_0} \cdot b_{n-1} + c_n - \left(\alpha + \frac{3}{8}\alpha^2 + \frac{1}{24}\alpha^3\right) \cdot e^{-T/\tau_0} \cdot z_{n-1} \quad (28)$$

$$c_n = e^{-T/\tau_0} \cdot c_{n-1} + \left(\frac{1}{4}\alpha^2 + \frac{1}{16}\alpha^3\right) \cdot e^{-T/\tau_0} \cdot z_{n-1}$$

Using a linear approximation for the exponent in Equation 14, and leaving out higher powers of $\alpha$ we obtain $$b_n = \left(1 - \frac{1}{2}\alpha\right) \cdot (b_{n-1} + c_{n-1}) - \alpha \cdot z_{n-1} \quad (29)$$

$$c_n = \left(1 - \frac{1}{2}\alpha\right) \cdot c_{n-1} + \frac{1}{4}\alpha^2 \cdot z_{n-1}$$

The final equation for the double pole baseline correction that is used for the far end baseline wander correction is as follows $$c_n = \left(1 - \frac{1}{2}\hat{\alpha}_{n-1}\right) \cdot c_{n-1} + \frac{1}{4}\hat{\alpha}_{n-1}^2 \cdot z_{n-1} \quad (30)$$

$$\Delta \tilde{b}_n^d = -\frac{1}{2}\hat{\alpha}_{n-1} \cdot \left(\tilde{b}_{n-1}^d - c_{n-1}\right) - c_{n-1} + \hat{\alpha}_{n-1} \cdot z_{n-1}$$

$$\tilde{b}_n^d = \tilde{b}_{n-1}^d + \Delta \tilde{b}_n^d$$

where $\tilde{b}_n^d$ is the baseline wander correction for the $n^{th}$ symbol, according to the double-pole model.

The complete correction, including $1^{st}$ order correction is expressed as follows in Equation 31.

$$\tilde{b}_n = \tilde{b}_{n-1} + \Delta \tilde{b}_n^s + \Delta \tilde{b}_n^d + \mu_b e_{n-1} \quad (31)$$

Figure 9:
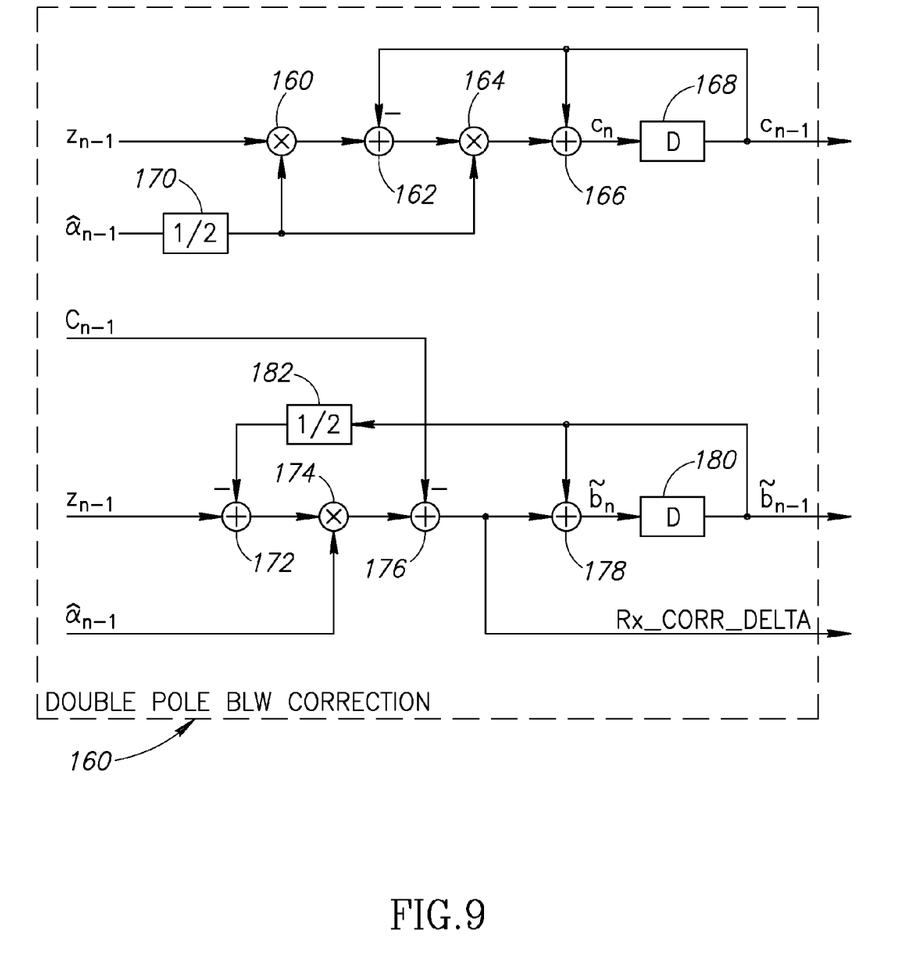
FIG. 9 is a block diagram illustrating the double pole baseline wander correction circuit of the present invention in more detail.

A block diagram illustrating the double pole baseline wander correction circuit of the present invention in more detail is shown in FIG. 9. The double pole baseline wander correction circuit, generally referenced 160, comprises adders 162, 166, 172, 176, 178, multipliers 160, 164, 174, delay blocks 168, 180 and gain adjusts 170, 182 which are bitwise shifts that are equivalent to multiplying by a power of 2. The circuit 160 is operative to implement the calculations of Equation 30. Note that one possible simplification is to eliminate the $2^{nd}$ order of $c_n$ in the equation for $b_n$ (i.e. the element $$\frac{1}{2}\hat{\alpha}_{n-1} \cdot c_{n-1}\Big).$$

The $2^{nd}$ order algorithm described supra is specifically tailored to match a high pass filter impairment. Model inaccuracies, in addition to other low frequency impairments (e.g., the analog step size errors described infra) must be tracked using a $1^{st}$ order loop as follows $$\tilde{b}_n = \tilde{b}_{n-1} + \mu_b e_{n-1} \quad (32)$$

This represents the most basic baseline wander correction which is operative to accumulate the slicer error multiplied by a fixed step size to reduce enhancement of the noise. The step size $\mu_b$ should be large enough to allow tracking of the baseline wander signal, but not excessively large in order to avoid noise enhancement.

The analog baseline wander correction is implemented in the example embodiment presented herein as a charge pump, acting upon triggers sent from the digital domain. Each trigger causes the correction to increase or decrease in a pre-determined amount, referred to as the step size. The step size is correlated with the gain of the PGA 80 (FIG. 5) to generate an approximately fixed step size of 30 mV when measured after the PGA.

The analog baseline wander correction, however, suffers from several impairments as follows.

1. Step size error: The step size may be up to 19% higher or 14% lower than the pre-determined size.
2. Changing step size: The step size can change as a function of the accumulated analog correction. For example, a step up from an accumulated correction of 100 mV may be different than a step up from 0 mV.
3. Up/down step mismatch: There may be a different of up to 1% between up and down steps.
4. Leakage: The given analog correction drops slowly, at a rate of up to 30 mV in 250,000 symbols.
5. Rise/fall times: An analog step may take more than 8 ns to complete.

Figure 10:
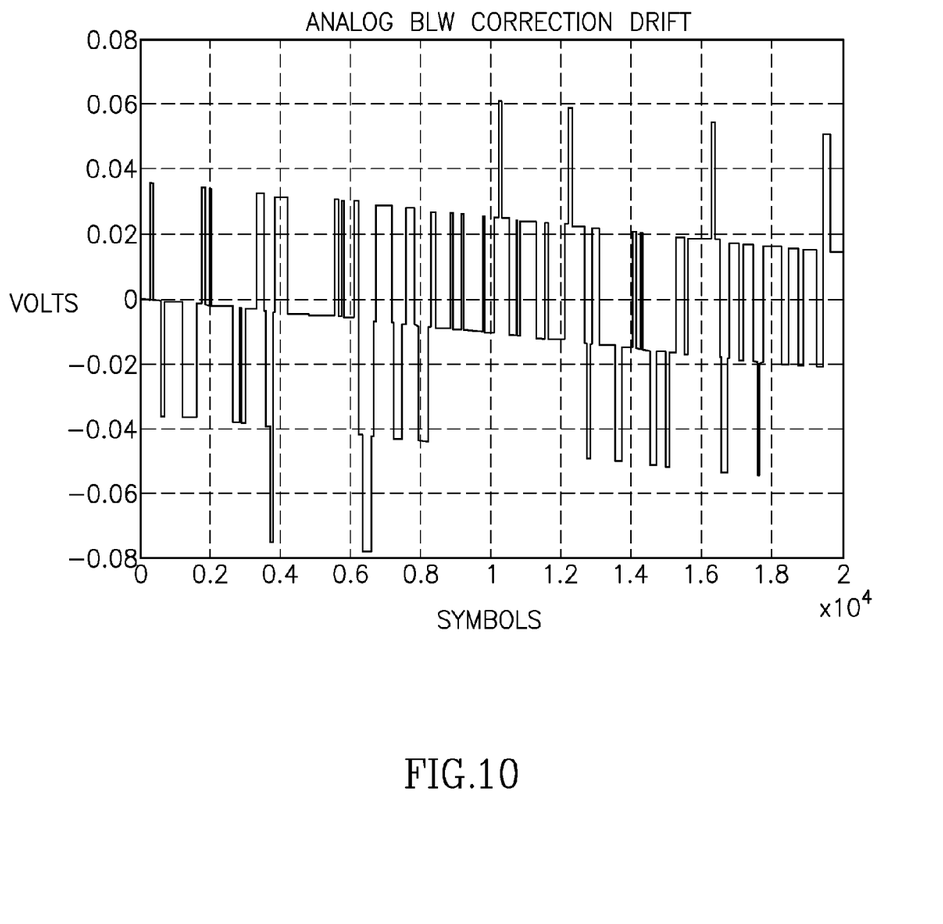
FIG. 10 is a graph illustrating the analog baseline wander correction drift during a series of up and down steps.

The step size error can be estimated, however, as described hereinbelow. The up/down step mismatch, leakage and rise/fall times impairments cause the analog correction to drift away from its intended value. This drift can be seen as an added low frequency interference, which can be tracked and corrected by the $1^{st}$ order correction described supra. FIG. 10 shows an example of the analog baseline wander correction signal during a series of up and down steps. Note that the drift caused by the step size errors can be much larger than the leakage rate (in the worst case shown here it is 20 mV in 20,000 symbols).

Figure 11:
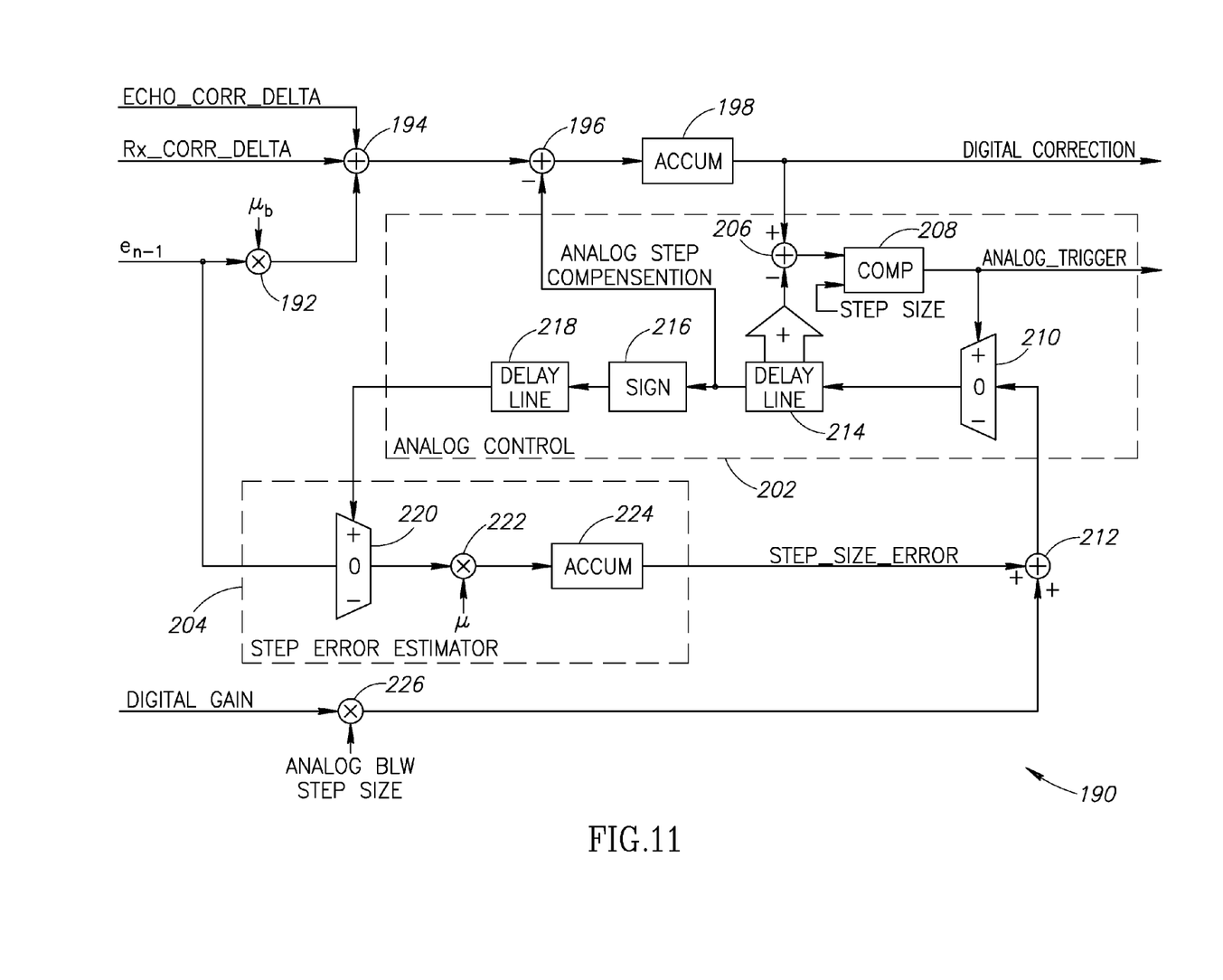
FIG. 11 is a block diagram illustrating the $1^{st}$ order and analog control circuit portion of the baseline wander correction circuit in more detail.

A block diagram illustrating the $1^{st}$ order and analog control circuit portion of the baseline wander correction circuit in more detail is shown in FIG. 11. The circuit, generally referenced 190, comprises analog control block 202, $1^{st}$ order correction 192, step error estimator 204, adders 194, 196, 212, multiplier 226 and accumulator 198. The $1^{st}$ order correction comprises multiplier 192. The analog control block comprises adder 206, comparator 208, selector 210, delay lines 214, 218 and sign block 216. The step error estimator comprises accumulator 224, multiplier 222 and selector 220.

The final digital correction is thus the sum of four accumulated corrections including: (1) the $2^{nd}$ order correction for the far-end signal (rx_corr_data); (2) the $2^{nd}$ order correction for the echo signal (echo_corr_data); (3) the 1st order correction; and (4) the accumulated compensations for the analog triggers. Therefore, instead of accumulating each of the above four corrections separately, the circuit uses a single accumulator 198.

At the point in the circuit where the digital baseline wander correction is applied (adder 84, FIG. 5), which is the relevant point for all the calculations described supra, the equivalent step size also depends on the fine gain 82. Therefore, the expression for calculating the equivalent step size is as follows $$\text{step} = \text{fine\_gain} \cdot (30 \text{ mV} + \text{step\_error}) \quad (33)$$

An LMS equation is used to estimate the step error based on the slicer error and the analog trigger as follows $$\text{step\_err}_n = \text{step\_err}_{n-1} + \mu \cdot \text{slicer\_err}_n \cdot \text{trigger}_{n-1} \quad (34)$$

The step size error estimator uses the above equations to calculate the step error.

It is noted that a positive error in the step size causes a positive slicer error when taking a positive step, and a negative slicer error when taking a negative step. A negative error in the step size causes a negative error with taking a positive step and vice versa. Therefore, the product of the step direction and the slicer error is a good estimator of the step error size.

Note also that there is a one clock difference between the trigger and the error. This is to ensure that the analog correction is in its full effect (i.e. for cases where the rise and fall time of the analog correction is longer then 8 ns).

When the digital correction increases beyond the equivalent analog step size, a trigger is sent to the analog baseline wander correction module. Once an analog step is taken, a step in the opposite direction must be applied in the digital domain in order to maintain continuity. The timing of this compensating step is important in order to avoid "jumps" in the baseline wander correction signal. The compensation should be applied at the exact moment the analog step affects the digital correction insertion point (i.e. when the first symbol that received the new analog correction reaches the point where it receives the digital correction).

With reference to the analog control mechanism 202 (FIG. 11), the delay line 214 is operative to store the analog steps that were already sent to the analog domain of the receiver, but did not yet appear in the digital correction insertion point. These steps represent future compensations that will be subtracted from the digital correction and therefore need to be taken into consideration when determining the next analog trigger.

The delay line 218 is operative to store analog triggers that are not yet seen at the input to the slicer. It is needed to match the timing of the analog triggers with that of the slicer error for purposes of the step size error calculation.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of baseline wander correction for use in a transformer coupled baseband communications receiver, said method comprising the steps of:

modeling baseline wander effect as a high pass filter resulting in a parametric model therefrom;
determining a total correction signal based on said parametric model; and
generating a digital correction signal and an analog correction signal based on said total correction signal.

2. The method according to claim 1, wherein said communication receiver comprises an Ethernet receiver.

3. The method according to claim 1, wherein said step of modeling comprises modeling said high pass filter as an exponential decay.

4. The method according to claim 1, wherein said parametric model comprises a single parameter alpha corresponding to the decay rate of said high pass filter.

5. The method according to claim 4, wherein said step of determining said total correction signal comprises estimating said alpha parameter.

6. The method according to claim 1, further comprising the step of applying said analog correction signal to an analog domain portion of said communications receiver.

7. The method according to claim 1, further comprising the step of applying said digital correction signal to a digital domain portion of said communications receiver.

8. An apparatus for correcting baseline wander in a transformer coupled baseband communications receiver, comprising:

a parametric model adapted to model baseline wander as one or more high pass filters, said parametric model comprising an exponential decay factor alpha;
a parameter estimator operative to estimate said alpha parameter;
means for determining a total correction signal based on said alpha parameter; and
means for generating a digital correction signal and an analog correction signal based on said total correction signal.

9. The apparatus according to claim 8, wherein said communication receiver comprises an Ethernet receiver.

10. The apparatus according to claim 8, further comprising means for applying said analog correction signal to an analog domain portion of said communications receiver.

11. The apparatus according to claim 8, further comprising the step of applying said digital correction signal to a digital domain portion of said communications receiver.

12. An apparatus for baseline wander correction in a transformer coupled baseband communications receiver, comprising:

a first circuit operative to generate a first correction signal for a far end signal path based on a parametric model wherein said baseline wander is modeled as one or more high pass filters having an exponential decay factor alpha;
a second circuit parallel to said first circuit and operative to generate a second correction signal for an echo signal path based on said parametric model;
means for summing said first correction signal and said second correction signal to yield a total correction signal therefrom; and
means for partitioning said total correction signal into a digital correction signal and an analog correction signal.

13. The apparatus according to claim 12, wherein said communication receiver comprises an Ethernet receiver.

14. The apparatus according to claim 12, wherein said first circuit and said second circuit comprise second order paths.

15. The apparatus according to claim 12, further comprising means for generating a first order correction signal subsequently added to said total correction signal before partitioning into analog and digital correction signals.

16. A baseband communications transceiver transformer coupled to a channel, comprising:
a transmitter;
a receiver comprising a front end transformer, baseline wander correction circuit, an analog to digital converter, an equalizer and a decoder; and
said baseline wander correction circuit comprising:
a parametric model adapted to model baseline wander as a high pass filter, said parametric model comprising an exponential decay factor alpha;
a parameter estimator operative to estimate said alpha parameter; and
means for determining a total correction signal based on said alpha parameter; and
means for generating a digital correction signal and an analog correction signal based on said total correction signal.

17. The transceiver according to claim 16, wherein said communications transceiver comprises an Ethernet compatible transceiver.

18. The transceiver according to claim 16, wherein said baseline wander correction circuit further comprises means for applying said analog correction signal to an analog domain portion of said communications receiver.

19. The transceiver according to claim 16, wherein said baseline wander correction circuit further comprises means for applying said digital correction signal to a digital domain portion of said communications receiver.

20. A method of baseline wander correction for use in a transformer coupled baseband communications receiver having an analog portion and a digital portion, said method comprising the steps of:
performing parametric estimation of transmitter and receiver transformers to yield a parametric model therefrom;
estimating baseline wander effect utilizing said parametric model to yield a total correction signal therefrom;
generating a digital correction signal and an analog correction signal from said total correction signal; and
canceling said baseline wander by applying said analog correction signal to said analog portion of said communications receiver and by applying said digital correction signal to said digital portion of said communications receiver.

21. The method according to claim 20, wherein said communications receiver comprises an Ethernet compatible receiver.

* * * * *